United States Patent
Yamamoto (10) Patent No.: US 6,923,517 B2
(45) Date of Patent: Aug. 2, 2005

(54) DRAWER DEVICE

(75) Inventor: Yasuo Yamamoto, Utsunomiya (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/650,720

(22) Filed: Aug. 29, 2003

(65) Prior Publication Data

US 2004/0100174 A1 May 27, 2004

(30) Foreign Application Priority Data

Nov. 26, 2002 (JP) ........................................ 2002-341724

(51) Int. Cl.[7] .............................................. B60N 3/10
(52) U.S. Cl. ................ 312/332; 248/311.2; 297/188.17
(58) Field of Search .............................. 312/332, 334.1; 297/188.17; 248/311.2

(56) References Cited

U.S. PATENT DOCUMENTS 5,427,447 A * 6/1995 Satoh .......................... 312/309
6,450,468 B1 * 9/2002 Hamamoto ............... 248/311.2
6,702,241 B2 * 3/2004 Harada ..................... 248/311.2

FOREIGN PATENT DOCUMENTS

| JP | 2-115734 | | 8/1990 |
| JP | 9-301042 | | 11/1997 |
| JP | 2001199272 A | * | 7/2001 |
| JP | 2003327035 A | * | 11/2003 |

* cited by examiner

Primary Examiner—Rodney B. White
Assistant Examiner—Joseph Edell
(74) Attorney, Agent, or Firm—Manabu Kanesaka

(57) ABSTRACT

A drawing device includes an outside case with a front opening, an inside case sliding to switch between a pulled-out position and a stored position, and a holder main member sliding to switch between a use position and a non-use position. The inside case includes a first locking member engaging the holder main member when the inside case is at the stored position. Through this engagement, it is possible to prevent the holder main member from sliding alone and allow the inside case and the holder main member to slide to the pulled-out position. When the inside case reaches the pulled-out position, the first locking member automatically releases the engagement to allow the holder main member to slide to the use position.

9 Claims, 7 Drawing Sheets

DRAWER DEVICE

BACKGROUND OF THE INVENTION AND RELATED ART STATEMENT

The present invention relates to a drawer device, particularly relates to a drawer device in which an inside case slides relative to a fixed outside case and a holder main member slides between a use position and a non-use position relative to the inside case (hereinafter, called a two-stage drawer structure).

Figure 7A:
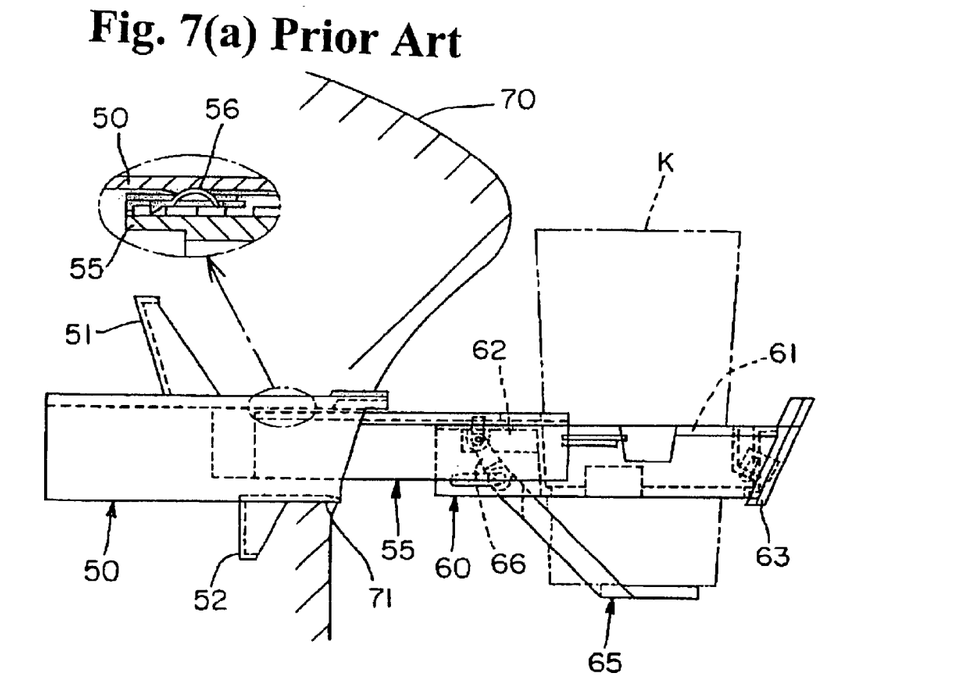
FIGS. 7(a) and 7(b) are cross sectional views of a conventional drawer device.
Figure 7B:
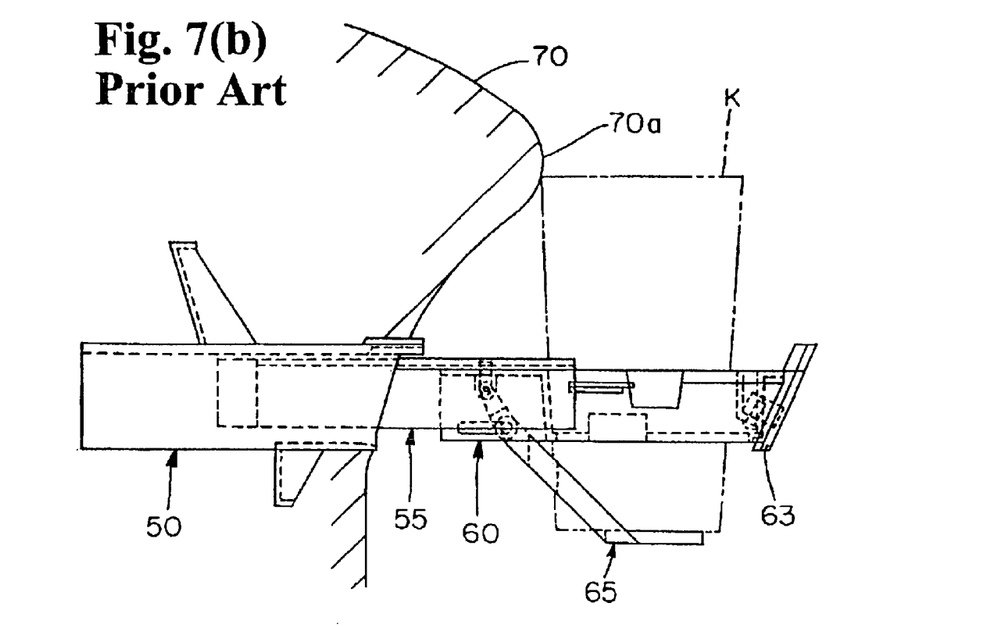

Japanese Patent Publication (Kokai) No. 2001-199272 has disclosed a drawer device as shown in FIGS. 7(a) and 7(b). The drawer device includes an outside case 50, an inside case 55, a holder main member 60 with a holding hole 61, and a movable member 65 attached to the holder main member 60. The outside case 50 includes an attaching portion 51 and a positioning portion 52, and has openings at the front side and backside thereof. The outside case 50 is mounted in, for example, an attaching depression of an instrument panel of a vehicle in a buried state.

The inside case 55 can slide in order to be switched between a pulled-out position where the inside case projects toward the front side from the outside case, and a stored position where the inside case is stored in the outside case. As shown in FIG. 7(a), an elastic engaging member 56 is provided between the inside case and the outside case for regulating the sliding at the pulled-out position and the stored position and for absorbing jolts during the sliding.

The holder main member 60 includes a piece 62 at a backside thereof and an operating portion 63 at a front face thereof. The holder main member 60 can slide in order to be switched between a use position where the holder main member is pulled out to the front side from the inside case, and a non-use position where the holder main member is stored in the inside case. A depression and a protrusion are provided between the holder main member and the inside case for regulating the holder main member at the front most position.

The movable member 65 is attached to the piece through an arm, and rotates obliquely downwardly in order to receive a bottom of the container when the holder main member is pulled out of the inside case. When the holder main member is pushed into the inside of the case, the movable member is stored inside the holder main member.

The two-stage drawer structure described above may be simplified as disclosed in Japanese Utility Model Publication (Kokai) No. 2-115736. In the drawer device, the holder main member 60 projects further according to a sliding amount of the inside case relative to the outside case. An outer dimension of the device from front to back is reduced, so that it is possible to use the device for an automobile having a small depth of an instrument panel 70.

In the two-stage drawer structure described above, a guide device (elastic engaging member 56 described above) such as a groove and a protrusion is provided between the inside case and the outside case, and between the holder main member and the inside case. Accordingly, the inside case slides relative to the outside case smoothly, and the holder main member slides relative to the inside case smoothly. In the conventional structure, when the inside case and the holder main member are pulled out to the front side or pushed in, the operating portion of the holder main member at the front face is pulled out and pushed in. However, the following problems may occur because there is no device for controlling the pulling-out motion.

First, when the holder main member slides to the use position, the holder main member easily moves slightly forward against a frictional force between the holder main member and the inside case before the inside case reaches the complete pulled-out position (the front most position in design). Therefore, a user mistakenly thinks that the device is in the use condition and stops pulling the holder main member before the inside case reaches the pulled-out position. In this state, the container may not be correctly maintained or may be easily jolted.

In an installed state where an upper part 70a of the instrument panel 70 projects inside of a car compartment as shown in FIG. 7(b), the container easily hits the upper part of the instrument panel. When the holder main member slides to the non-use position, if the inside case is pushed slightly toward the backside before the holder main member reaches the non-use position (the backmost position in design), there is a problem in which the movable member 65 projecting outside from the front opening of the inside case 55 interferes with other members.

In view of the problems described above, an object of the present invention is to provide a drawer device in which an inside case and a holder main member are reliably controlled upon pulling-out and pushing-in, so that the advantages of the two-stage drawer structure is stably maintained regardless of the operation of the user or the installed state.

Further objects and advantages of the invention will be apparent from the following description of the invention.

SUMMARY OF INVENTION

According to the first aspect of the present invention, a drawing device includes an outside case with a front opening, an inside case sliding to switch between a pulled-out position where the inside case projects from the front opening of the outside case and a stored position where the inside case is stored in the outside case, and a holder main member sliding to switch between a use position where the holder main member is pulled out from a front opening of the inside case and a non-use position where the holder main member is stored in the inside case.

In the first aspect of the invention, all the operations of switching between the pulled-out position and stored position and between the use position and non-use position are carried out through a front face side of the holder main member. The inside case includes a first locking member urged in one direction in a state that the first locking member is pivotally supported to be able to swing. The first locking member engages a corresponding part of the holder main member when the inside case is at the stored position. Through this engagement, it is possible to prevent the holder main member from sliding alone and allow the inside case and the holder main member to slide to the pulled-out position. Also, when the inside case reaches the pulled-out position, the first locking member automatically releases the engagement to allow the holder main member to slide to the use position.

In the first aspect of the invention described above, when the inside case is at the stored position (the holder main member is at the non-use position), the locking member engages the corresponding part of the holder main member. Accordingly, the inside case is fixed to the holder main member and the holder main member does not slide independently. Thus, when a user pulls the holder main member with the front side of the holder main member, the inside case slides toward the front with the holder main member and switches from the stored position to the pulled-out position. After the inside case reaches the pulled-out position (the front most position in design), the holder main member slides toward the front and switches to the use position from the non-use position.

With the structure described above, the holder main member does not slide toward the front as far as the inside case does not reach the pulled-out position. Therefore, it is possible to securely switch the inside case to the pulled-out position as it is designed, when the inside case is pulled out. As a result, it is possible to solve a problem in which a user mistakes that the inside case is the most front position and releases the inside case even though the inside case is still in the middle of the pulled-out process, so that the holder main member can hold the container stably as it is designed.

According to the second aspect of the present invention, the inside case may include a second locking member urged in one direction in a state that the second locking member is pivotally supported to be able to swing. The second locking member engages a corresponding part of the outside case when the inside case is at the pulled-out position and the holder main member is at the use position. When the holder main member slides from the use position to the non-use position, the second locking member automatically releases the engagement to allow the inside case to slide to the stored position.

In the second aspect of the invention, the second locking member engages the corresponding part of the outside case when the inside case is at the pulled-out position, so that the inside case does not come out from the outside case. In addition, as far as the holder main member does not slide from the use position to the non-use position, the inside case does not slide to the stored position. Accordingly, when the holder main member has a movable member, the inside case slides to the stored position only after the movable member is stored inside the holder main member and both of them are stored in the inside case. Therefore, it is possible to solve a problem in which the movable member interferes with the inside case.

According to the third aspect of the present invention, the first and second locking members have roughly the same shape, and each of the locking members is pivotally supported on a corresponding part of the inside case through a shaft member. One end of a pivot portion has an engaging claw and the other end of the pivot portion has a cam portion. Thus, it is possible to use the same part for the first and second locking members, thereby reducing a manufacturing cost and making it easy to manage and handle parts.

According to the fourth aspect of the present invention, the first locking member has the engaging claw engaging a depression formed in the holder main member. A protrusion formed in the outside case pushes the cam portion of the first locking member to release the engagement. The second locking member has the engaging claw engaging a depression formed in the outside case. A projection formed in the holder main member pushes the cam portion to release the engagement. As a result, it is possible to operate the locking members through such a simple structure as the depression and protrusion.

According to the fifth aspect of the present invention, the holder main member includes a holding hole and a movable member. The movable member is rotatable and moves laterally or downwardly for supporting an outside or a bottom of the container inserted into the holding hole when the holder main member is at the use position. The movable member may rotate below the holder main member. This configuration is associated with the advantage of the second locking member described above.

DETAILED DESCRIPTION OF PREFERRED EMBODIMENTS

Figure 1A:
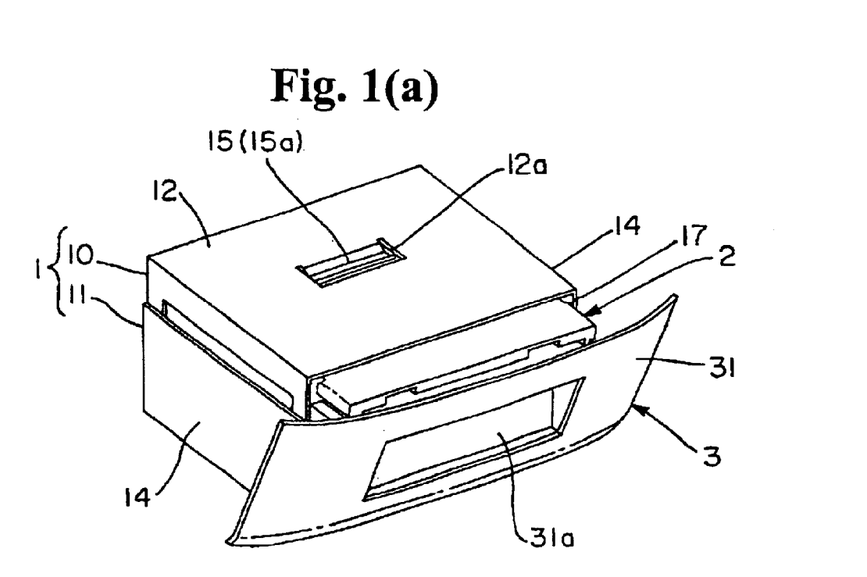
FIGS. 1(a) and 1(b) are schematic views of a drawer device according to an embodiment of the present invention.
Figure 1B:
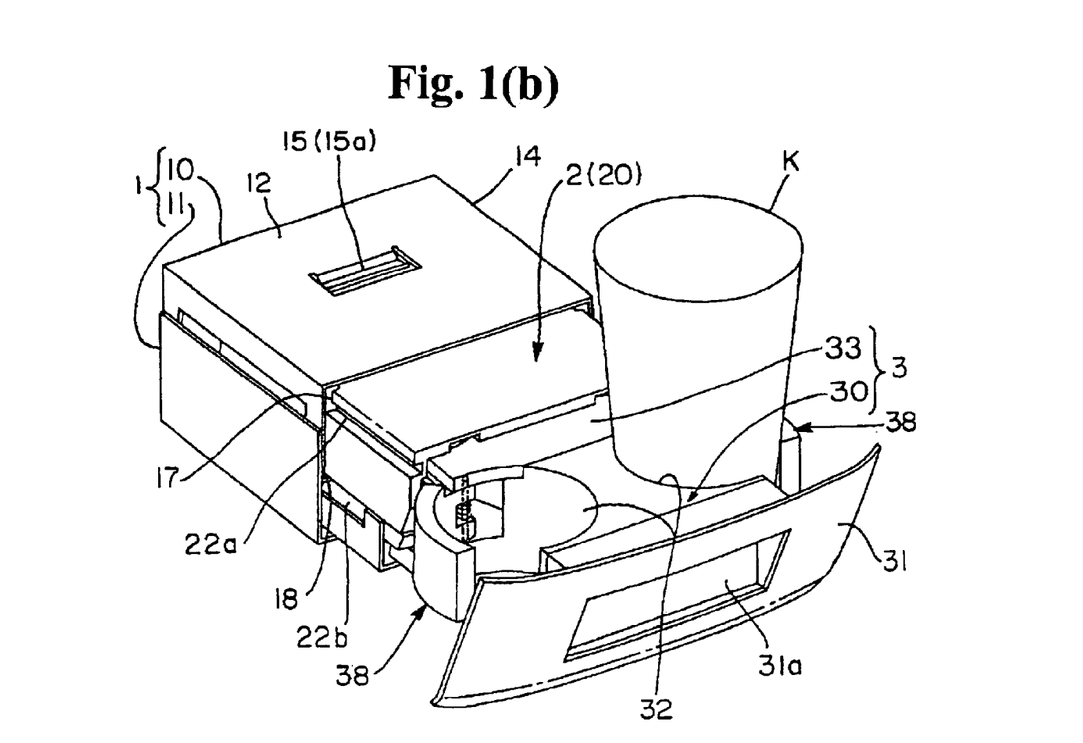
Figure 2:
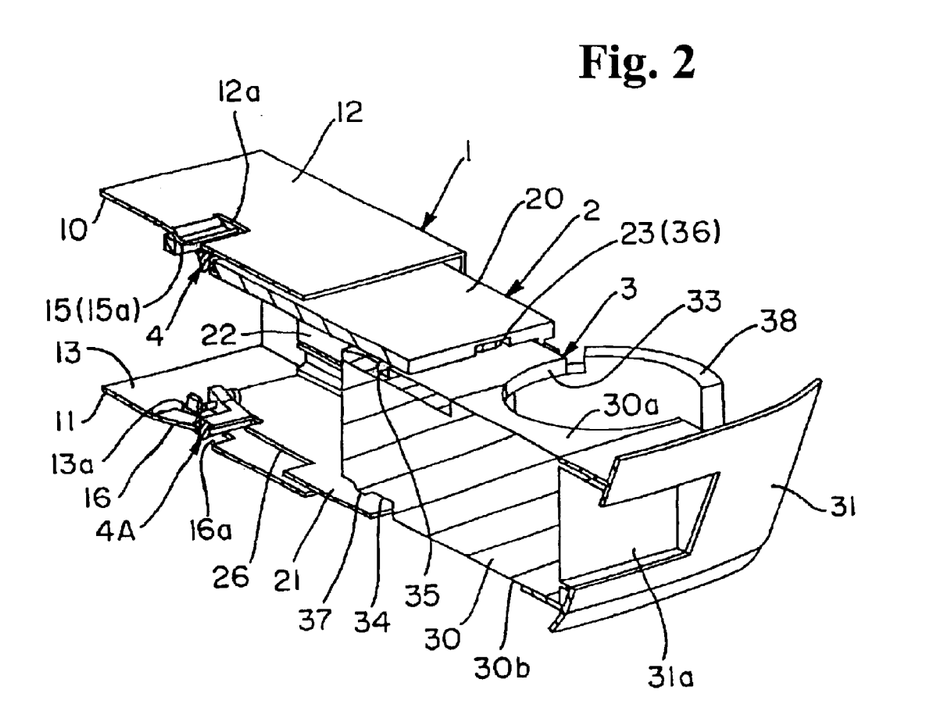
FIG. 2 is a perspective view cut in section of the drawer device of the present invention.
Figure 3A:
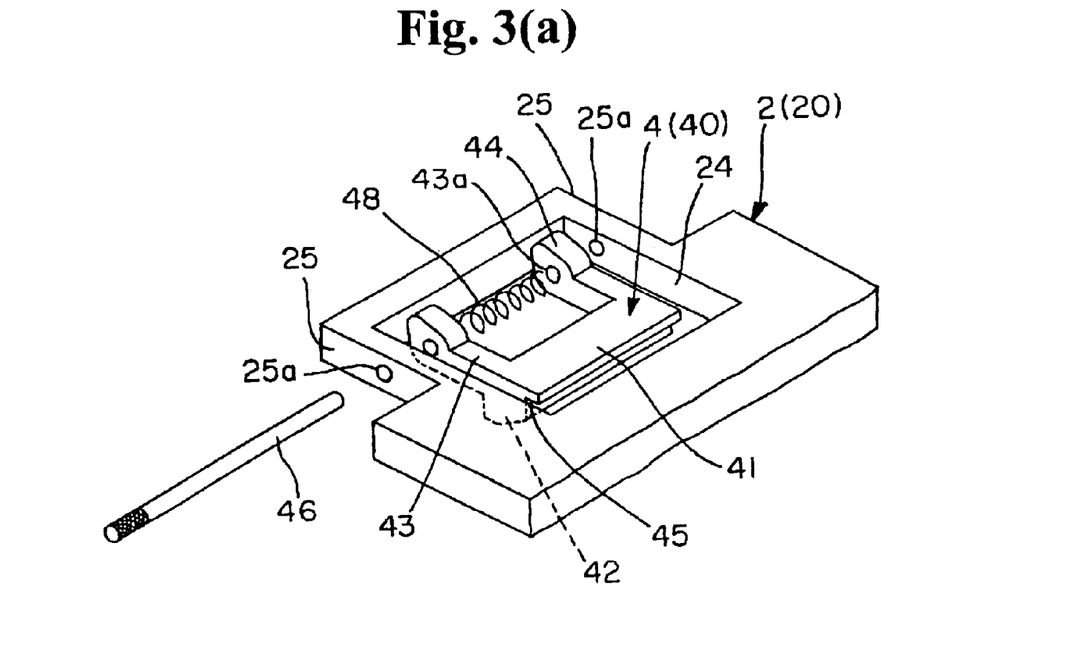
FIGS. 3(a) and 3(b) are views of locking members provided in the drawer device of the present invention.
Figure 3B:
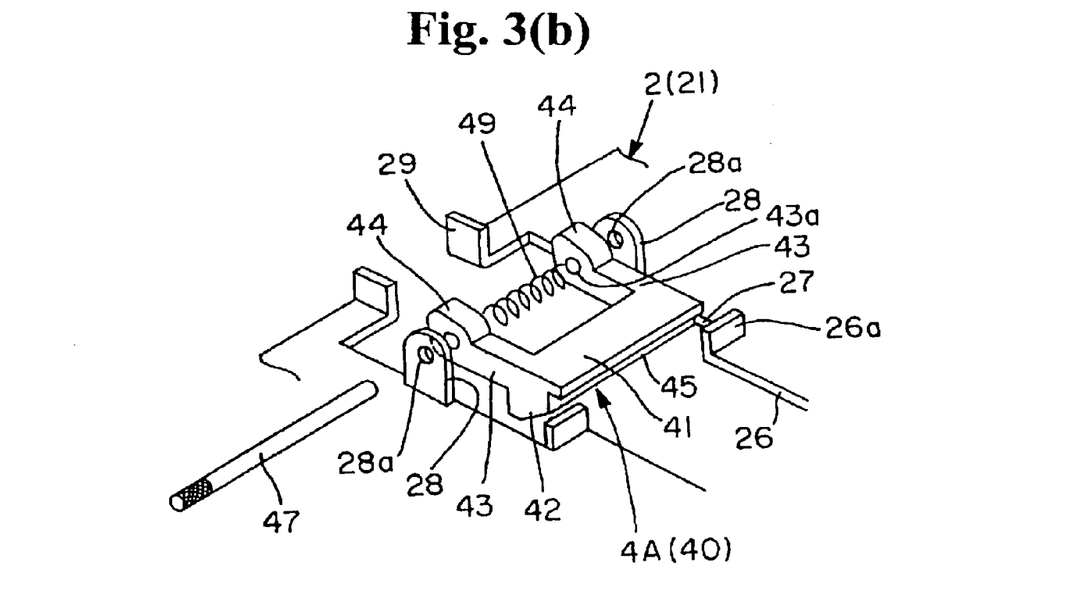
Figure 4A:
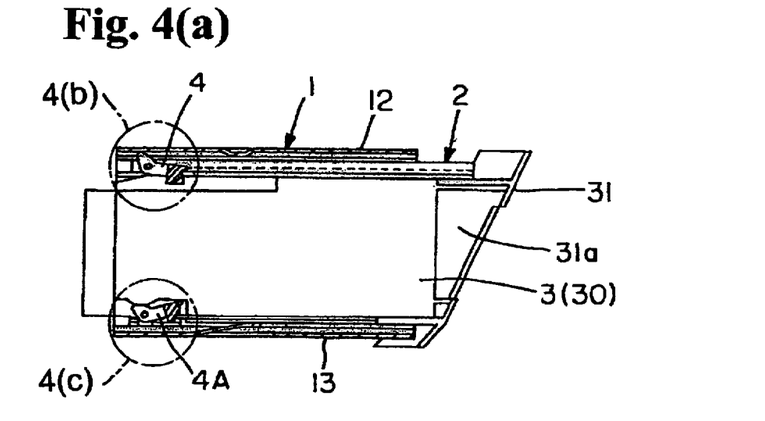
FIGS. 4(a)–4(c) are cross sectional views of an inside case of the drawer device at a stored position.
Figure 4B:
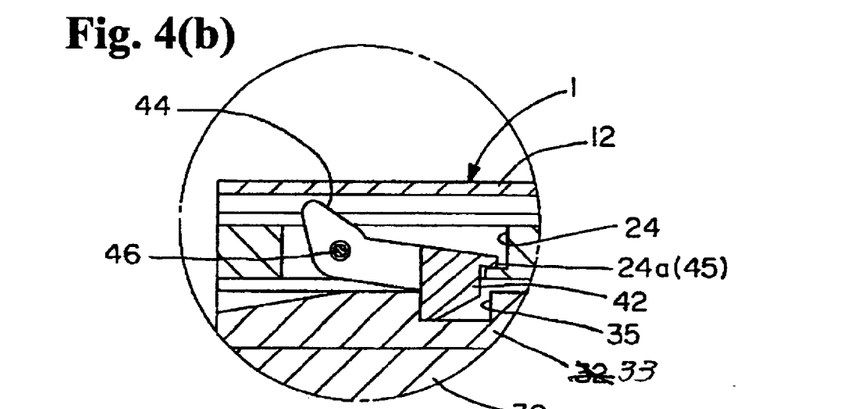
Figure 4C:
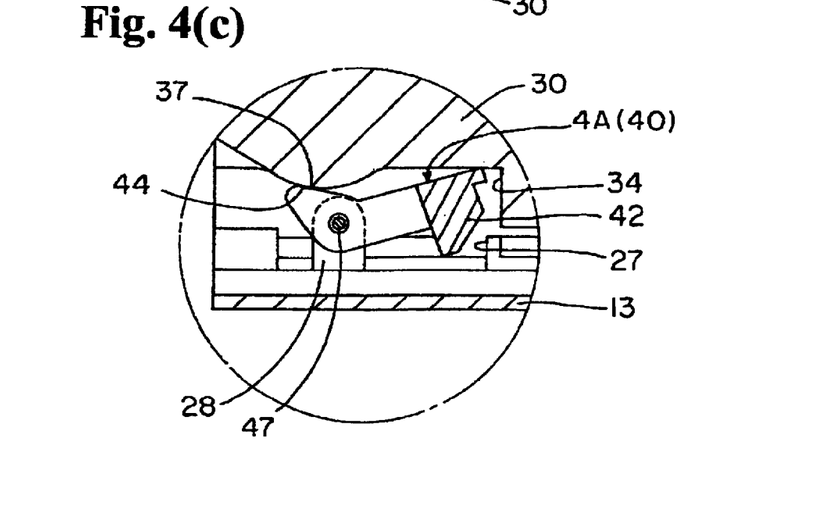
Figure 5A:
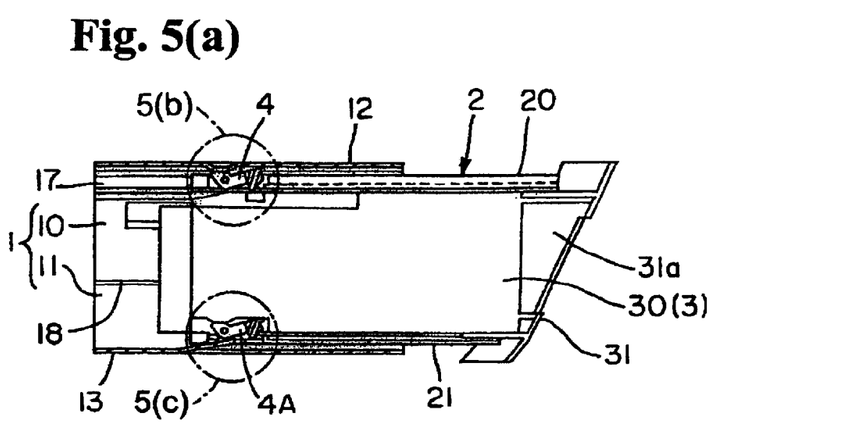
FIGS. 5(a)–5(c) are cross sectional views of the inside case of the drawer device at a pulled-out position.
Figure 5B:
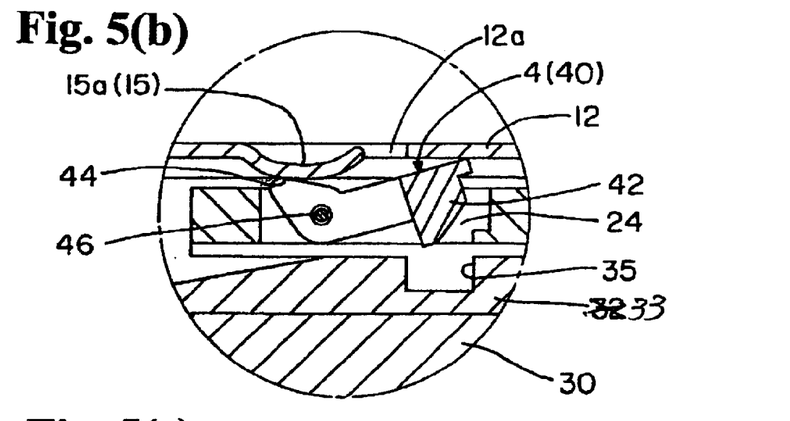
Figure 5C:
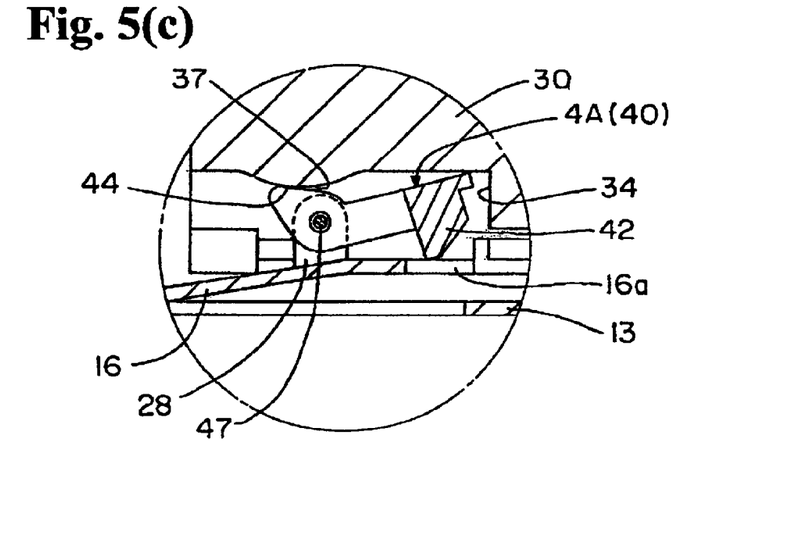
Figure 6A:
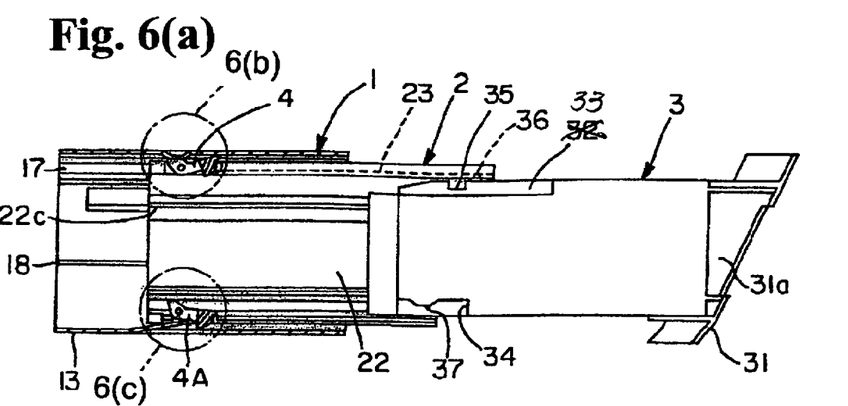
FIGS. 6(a)–6(c) are cross sectional views of a holder main member of the drawer device at a use position.
Figure 6B:
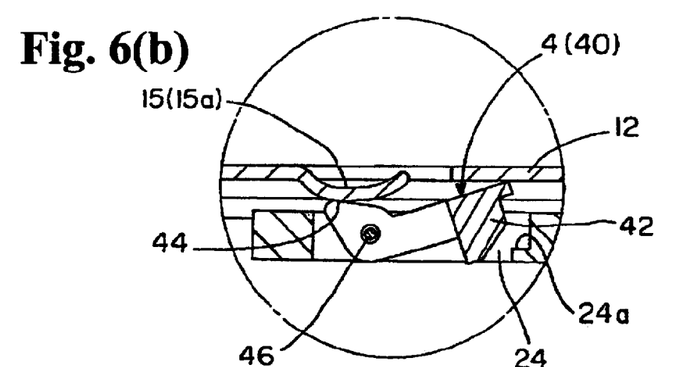
Figure 6C:
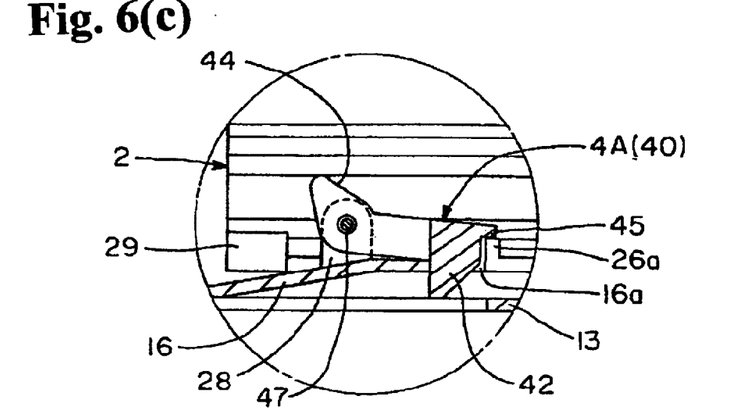

Hereunder, embodiments of the present invention will be explained with reference to the accompanying drawings. FIGS. 1(a) and 1(b) are schematic views showing a drawer device of the present invention, wherein FIG. 1(a) shows a holder main member at a non-use position and FIG. 1(b) shows the holder main member at a use position. FIG. 2 is a schematic sectional view of the drawer device taken along a front-to-back direction in the state of FIG. 1(b). FIGS. 3(a) and 3(b) are views of upper and lower locking members provided in the drawer device of the present invention. FIGS. 4(a)–4(c), 5(a)–5(c), and 6(a)–6(c) show an operation of each locking member, wherein FIGS. 4(a), 5(a) and 6(a) are cross sectional views of the drawer device, FIGS. 4(b), 5(b) and 6(b) are enlarged schematic views of the upper locking member, and FIGS. 4(c), 5(c) and 6(c) are enlarged schematic views of the lower locking member. Also, in FIGS. 4(a), 5(a), 6(a), hatching is omitted except the outside case for the sake of presentation. Hereinafter, a structure of the device will be explained, and then usage and the operation of the device will be described.

According to the embodiment, the drawer device is configured as a cup holder for a vehicle, and includes an outside case 1, an inside case 2, and a holder main member 3. The drawer device also includes the first and second locking members 4, 4A attached to the inside case 2, and a movable member 38 attached to the holder main member 3. The drawer device of the embodiment is installed in an instrument panel 70 of an automobile as an attachment similar to the one shown in FIGS. 7(a), 7(b). The drawer device may be built into various types of consoles equipped inside the car compartment.

In a configuration of the drawer device, the outside case 1 is attached to an attaching depression at an attached portion side. The inside case 2 slides to switch between a stored position where the inside case 2 is pushed into the outside case 1 and a use position where the inside case 2 is pulled out. The holder main member 3 slides to switch between a non-use position where the holder main member 3 is pushed into the inside case 2 and a use position where the holder main member 3 is pulled out. A conventional drawer device can be used as the basic structure (including the cup holder) except for locking members 4, 4A and a configuration around the locking members 4, 4A. A movable member 38 may be the movable member 65 in the conventional drawer device shown in FIGS. 7(a), 7(b).

The outside case 1 includes an upper half member 10 and a lower half member 11. An inside of the outside case 1 is divided by an upper face 12 formed of the upper half member 10, a lower face 13 formed of the lower half member 11, and both side faces 14 formed of the upper and lower half members 10, 11. Both half members 10, 11 are joined at both side faces 14, and front sides and backsides of the half members 10, 11 are open. A downward protrusion 15*a* is provided at the upper face 12 for pressing. A depression 16*a* is provided at the lower face 13 for an engaging hole.

The protrusion 15*a* is formed in an arch shape projecting inwardly, and provided at a part of an elastic piece 15 divided by a roughly U-shaped slit 12*a* at an approximate center of the upper face 12. The depression 16*a* is formed in an elastic inclining piece 16 divided by a roughly U-shaped slit 13*a* at an approximate center of the lower face 13. The depression 16*a* is formed by a gap between a free end of the inclining piece 16 and a corresponding part of the slit 13*a*.

In FIGS. 1(*a*), 1(*b*) and 6(*a*), reference numeral 17 designates guide grooves with a roughly U-shaped cross section provided in inner walls of the side faces 14, and reference numeral 18 designates lower end portions of the upper half member 10 folded toward the inner side of the case. In the outside case 1, portions (not shown) equivalent to the attaching portion 50 and the positioning portion 52 in FIGS. 7(*a*), 7(*b*) may be provided as necessary.

The inside case 2 is divided by a rather thick upper face 20, a lower face 21 thinner than the upper face 20, and both side faces 22, and front and back faces of the inside case 2 are open. As shown in FIG. 4(*a*), the inside case 2 has a length slightly longer than the entire length of the outside case 1. A pair of guide grooves 23 is provided in the upper face 20 at both sides and extends in the longitudinal direction of the inner side of the inside case. An alignment hole or section 24 corresponding to the first locking member 4 is also provided on the upper face 20 at a backside thereof and roughly in the middle in a width direction. The guide grooves 23 have slightly narrow front sides.

As shown in FIG. 3(*a*), the alignment section 24 is formed in a roughly rectangular shape having a size so that the first locking member 4 is disposed and rotates. The alignment section 24 also includes shaft holes 25*a* coaxially formed in right and left portions 25 dividing the alignment section 24. The first locking member 4 has cut portions corresponding to the alignment section 24 at both sides in the backside of the upper face 20, so that a shaft member 46 (described later) can be fitted in the shaft holes 25*a* from the cut portions.

As shown in FIG. 3(*b*), the lower face 21 includes a cut portion 26 at the middle in the width direction having a roughly rectangular shape from a slightly forward side at the middle in the longitudinal direction to a back end; an alignment section 27 with a wider cut at a backside of the cutting portion 26 for receiving the second locking member 4A; control portions 26*a* projecting from both back ends of the cutting portion 26; projecting pieces 28 projecting from both sides of the alignment section 27 for pivotally supporting the second locking member 4A; shaft holes 28*a* coaxially provided in the projecting pieces 28; and small projecting pieces 29 extending from both sides at the backside of the alignment section 27.

The side faces 22 include guide grooves 22*a* extending in the longitudinal direction on outer walls thereof; guide grooves 22*b* for receiving the lower end portions 18; and rails 22*c* (in FIG. 6(*a*)) extending parallel to the longitudinal direction at upper and lower parts of the inner walls.

The holder main member 3 includes a main portion 30 to be fitted in the inside case 2; an operating portion 31 with a blade shape at a front side of the main portion 30; holding holes 32 provided on both front sides of the portion 30; movable members 38 corresponding to the holding holes 32 for holding the outside of the container K inserted in the holding holes 32.

The operating portion 31 is attached to a front end of the main portion 30, and has a depression 31*a* at the central part of the front face for placing a finger and a size large enough for covering the inside case 2 and the outside case 1 from the front face side. The main portion 30 includes a pair of holding holes 32 at the right and left sides; a plate 33 flush with an upper face 30*a* at backsides of the holding holes 32; a step portion 34 at a lower back face 30*b*; and guide grooves (not shown) at the side faces for receiving the rail portions 22*b*.

Each of the holding holes 32 has an opening at an outer surface of a cylindrical body. Each of the movable member 38 has one side rotatably supported relative to the opening of the holding hole, and is urged in one direction with an urging spring as shown in FIG. 1(*b*), so that the holding hole 32 and the movable member 38 hold the container K inserted from above even in a case where the container K has a slightly different outer diameter.

The plate 33 has a depression 35 for engaging the first locking member 4 pivotally supported on the alignment section 24, and guide protrusions 36 corresponding to the guide grooves 23. The step portion 34 corresponding to the alignment section 27 is provided on the backside of the lower face 30*b* at the middle in the width direction. The second locking member 4A attached to the alignment section 27 is fitted in the step portion 34. The step portion 34 has a projection 37 for pressing the cam portion 42 of the second locking member 4A when the holder main member 3 slides from the use position to the non-use position.

Each of the locking members 4, 4A has a size so that a main member 40 thereof can be stored in the alignment section 24 or the alignment section 27 of the inside case 2 respectively as shown in FIGS. 3(*a*), 3(*b*). Each of the locking members 4, 4A is formed in a roughly U-shape made of the same material. The main member 40 has an engaging claw 42 on one side thereof at the middle of a U-shaped intermediate portion 41 and cam portions 44 projecting upward on the other side thereof at free ends of U-shape arms 43.

The intermediate portion 41 is disposed laterally, and has the engaging claw 42 projecting downwardly. A step 45 is formed above the engaging claw 42 at a lower end of a face extending from the U-shape arms 43. The shaft holes 43*a* are coaxially provided at lower sides of the cam portions 44, or the free ends of the U-shape arms 43. The cam portions 44 have top portions projecting from the U-shape arms 28, and curved cam surface at upper surfaces thereof.

The locking member 4 is disposed at an inside of the alignment section 24 and rotatably supported on the alignment section 24 via the shaft member 46 in a state where the shaft member 46 passes through one of the shaft holes 25*a*, one of the shaft holes 43*a*, a coiled urging spring 48, the other of the shaft holes 43*a*, and the other of the shaft holes 25*a*. When both ends of the urging spring 48 are fixed to corresponding parts, the locking member 4 is urged to rotate downwardly, or in an engaging direction. The locking member 4 stays in the engaged state as the step 45 engages a front end portion 24*a*, i.e. a lower step part of the alignment section 24, as shown in FIG. 4(*b*).

The locking member 4A is disposed at an inside of the alignment section 27 and rotatably supported on the alignment section 27 via the shaft member 47 in a state where the shaft member 47 passes through the shaft holes 28a of one of the projecting pieces 28, one of the shaft holes 43a, a coiled urging spring 49, one of the shaft holes 43a, and the shaft hole 28a of the other of the projecting pieces 28. When both ends of the urging spring 49 are fixed to corresponding parts, the locking member 4A is urged to rotate downwardly, or in an engaging direction. The locking member 4A stays in the engaged state as the step 45 engages the control portions 26a at the front side of the alignment section 27, as shown in FIG. 6(c).

In an assembled state of the drawer device, the inside case 2 slides to switch between the stored position and the pulled-out position where the inside case 2 is pulled out toward the front relative to the outside case 1 through the engagements between the corresponding parts of the guide grooves 22a and the guide grooves 17, and between the guide grooves 22b and the lower end portions 18. In the stored position, the inside case 2 is restricted by the operating portion 31 of the holder main member 3, and by the lower end portions 18 abutting against the front end of the guide grooves 22b in the pulled-out position.

The holder main member 3 slides to switch between the non-use position and the use position where the holder main member 3 is pulled out toward the front relative to the inside case 2 through the engagements between the guide grooves 23 and the guide protrusions 36 and between the rail portions 22c and the guide grooves on the sides of the holder main member. In the non-use position, the holder main member 3 is restricted by the operating portion 31. In the use position, the guide protrusion 36 is restricted by the front groove portions of the guide grooves 23 with a narrow width.

The movable members 38 rotate toward the holding holes 32 at the non-use position of the holder main member 3 and are stored in the inside case 2 without rattling. When the holder main member 3 is pulled out, the movable members 38 rotate toward the outside of the holding holes 32 and become ready for use. In this embodiment, in addition to the above-mentioned basic operation, the switching operation is improved as compared with the conventional device.

FIGS. 4(a)–4(c) show the non-use condition of the drawer device, in which the inside case 2 is in the stored position, and the holder main member 3 is in the non-use position. In this state, the locking member 4 at the upper side is urged to rotate downwardly, or in the engaging direction with an urging force of the urging spring 48 (not shown). The engaging claw 42 engages the depression 35 of the holder main member 3 (plate 33), so that the inside case 2 is fixed to the holder main member 3 until the inside case 2 almost reaches the pulled-out position (the front most position in the design) in FIG. 5(a). The locking member 4A at the lower side is released from the engagement in the states shown in FIGS. 4(a) and 5(a). FIGS. 5(a)–5(c) show the states in the middle of the process of pulling out the drawer device, and the inside case 2 is at the pulled-out position.

When the inside case 2 slides to a position just before the inside case 2 reaches the pulled-out position, as shown in FIG. 5(b), the cam portions 44 abut against the protrusion 15a of the elastic piece 15 in the outside case 1, so that the locking member 4 is pressed and rotate in the counterclockwise direction around the shaft member 46. As a result, the engaging claw 42 is released from the depression 35. In other words, in the embodiment, until the inside case 2 is pulled with the operating portion 31 to reach the pulled-out position, the holder main member 3 and the inside case 2 are pulled together through the engagement of the locking member 4. After the inside case 2 reaches the pulled-out position, the engagement between the engaging claw 42 and the depression 35 is automatically released. Once the engagement is released, only the holder main member 3 slides forward to the use position.

Accordingly, when a user pulls the drawer device with the operating portion 31, the holder main member 3 does not slide forward until the inside case 2 reaches the pulled-out position (the front most position in the design). After the inside case 2 is switched to the pulled-out position, the holder main member 3 slides to the use position shown in FIGS. 6(a)–6(c). With this structure, it is possible to solve the problem of the conventional device where only the holder main member is pulled out in the middle of the process of pulling out the inside case. It is also possible to stably hold the container K with the movable members 38 in the use condition, and to prevent the container K from hitting the upper part 70a of the instrument panel 70 projected toward the front as shown in FIG. 7(b).

The locking member 4A at the lower side is released from the engagement in the states as shown in FIGS. 4(c) and 5(c). In other words, the cam portions 44 abut against the projection 37 at the back lower side of the holder main member 3, so that the locking member 4A is pressed and rotates in the counterclockwise direction around the shaft member 46. As a result, the engaging claw 42 is released from the depression 16a as shown in FIG. 5(c). This state is maintained as far as the holder main member 3 is not shifted relative to the inside case 2, i.e. even after the inside case 2 reaches the pulled-out position as shown in FIG. 5(a).

When the holder main member 3 is pulled out forward from the non-use position shown in FIG. 5(a), the projection 37 moves forward away from the cam portions 44, i.e. the projection 37 releases the pressure on the cam portions 44. Thus, the locking member 4A rotates clockwise around the shaft member 47 with an urging force of the urging spring 49 (not shown), and the engaging claw 42 engages the depression 16a as shown in FIG. 6(c). The inside case 2 is fixed at a position relative to the outside case 1 through the engagement until the holder main member 3 approaches close to the non-use position.

As described above, it is possible to maintain the engagement between the engaging claw 42 and the depression 16a until the holder main member 3 is completely switched to the non-use position relative to the inside case 2 when the operating portion 31 is pushed to make the drawer device in the non-use state. Therefore, even through the holder main member 3 includes the movable members 38, the inside case 2 slides to the stored position after the movable members are stored in the corresponding parts of the holder main member 3 or the inside case 2, thereby eliminating the interference with the inside case.

As described above, in the drawer device of the present invention, the first locking member provided on the inside case engages the corresponding part of the holder main member at the stored position of the inside case. The engagement is released when the inside case is switched to the pulled-out position. When the holder main member is pulled to use the drawer device, the holder main member slides forward after the inside case reaches the pulled-out position. Therefore, it is possible to solve the problem in which the inside case is inadvertently stopped in the middle of the process of pulling out. As a result, it is possible to hold the container stably and improve the reliability of the drawer device.

Also, with the second locking member, after the holder main member is switched to the non-use position, the inside case slides to the stored position. Thus, it is possible to solve the problem of interference as described above even if the holder main member includes the movable members.

While the invention has been explained with reference to the specific embodiments of the invention, the explanation is illustrative and the invention is limited only by the appended claims.

What is claimed is:

1. A drawer device for holding a container, comprising:
   an outside case with a front opening,
   an inside case disposed in the outside case to move between a pulled-out position where the inside case is pulled out from the outside case through the front opening and a stored position where the inside case is stored in the outside case,
   a holder main member disposed in the inside case to move between a use position where the holder main member is pulled out from the inside case and a non-use position where the holder main member is stored in the inside case, and
   a first locking member having an engaging claw pivotally supported on the inside case and urged in one direction to engage the holder main member to thereby fix the inside case to the holder main member to slide together, and releasing means for releasing the holder main member when the holder main member is pulled forward and the inside case is at the pulled-out position so that only the holder main member can slide further toward the use position,
   wherein said holder main member includes a depression engaging the engaging claw, and said releasing means is a protrusion protruding inwardly from the outside case so that when the protrusion presses a part of the engaging claw, the engaging claw disengages from the depression to allow the holder main member to move forward from the inside case.

2. A drawer device according to claim 1, wherein said holder main member includes a holding hole for receiving the container and a movable member rotatably attached to the holder main member for supporting the container when the holder main member is situated at the use position.

3. A drawer device according to claim 1, wherein said holder main member has a front face for covering the front opening of the outside case.

4. A drawer device according for holding a container, comprising:
   an outside case with a front opening,
   an inside case disposed in the outside case to move between a pulled-out position where the inside case is pulled out from the outside case through the front opening and a stored position where the inside case is stored in the outside case,
   a holder main member disposed in the inside case to move between a use position where the holder main member is pulled out from the inside case and a non-use position where the holder main member is stored in the inside case,
   a first locking member pivotally supported on the inside case and urged in one direction to engage the holder main member to thereby fix the inside case to the holder main member to slide together, said first locking member releasing the holder main member when the holder main member is pulled forward and the inside case is at the pulled-out position so that only the holder main member can slide further toward the use position, and
   a second locking member pivotally supported on the inside case and urged in one direction to engage the outside case when the holder main member is pulled forward and the inside case is at the pulled-out position so that only the holder main member can slide further toward the use position, said second locking member being released from the outside case when the holder main member is pushed rearward and the holder main member is at the non-use position so that the inside case can slide toward the stored position.

5. A drawer device according to claim 4, wherein said first and second locking members are formed in substantially a same shape, and include front ends, rear ends, engaging claws at the front ends, and cam portions at the rear ends.

6. A drawer device according to claim 5, wherein said holder main member includes a depression for engaging the engaging claw of the first locking member, and said outside case includes a protrusion for pushing the cam portion of the first locking member to release the engaging claw.

7. A drawer device according to claim 5, wherein said outside case has a depression for engaging the engaging claw of the second locking member, and said holder main member includes a projection for pushing the cam portion of the second locking member to release the engaging claw.

8. A drawer device for holding a container, comprising:
   an outside case with a front opening,
   an inside case disposed in the outside case to move between a pulled-out position where the inside case is pulled out from the outside case through the front opening and a stored position where the inside case is stored in the outside case,
   a holder main member disposed in the inside case to move between a use position where the holder main member is pulled out from the inside case and a non-use position where the holder main member is stored in the inside case, and
   locking means for selectively locking the outside case, inside case and holder main member, said locking means operating such that when the holder main member is pulled, the inside case with the holder main member therein is moved from the outside case and then the holder main member is moved forward from the inside case, and when the holder main member is retracted, the holder main member is moved into the inside case and then the inside case with the holder main member therein is moved into the outside case, said locking means including first locking means for selectively locking the holder main member to the inside case, said first locking means locking the holder main member to the inside case between the stored position and the pulled-out position and releasing the holder main member at the pulled-out position, and second locking means for selectively locking the inside case to the outside case.

9. A drawer device according to claim 8, wherein said first locking means includes first releasing means formed at the outside case for releasing the holder main member from the inside case at the pulled-out position, and said second locking means includes second releasing means formed at the holder main member for engaging the inside case to the outside case only when the inside case comes to the pulled-out position.

* * * * *